(12) United States Patent
Prabhakar et al.

(10) Patent No.: US 11,418,614 B2
(45) Date of Patent: Aug. 16, 2022

(54) SYSTEM AND METHOD FOR PROCESSING SUBSCRIPTION RELATED DATA

(71) Applicant: LARSEN AND TOUBRO INFOTECH LIMITED, Maharashtra (IN)

(72) Inventors: Brijesh Prabhakar, Karnataka (IN); Devanathan Desikan, Tamil Nadu (IN); Sagar Wamanrao Pise, Maharashtra (IN)

(73) Assignee: LARSEN AND TOUBRO INFOTECH LIMITED, Maharashtra (IN)

( * ) Notice: Subject to any disclaimer, the term of this patent is extended or adjusted under 35 U.S.C. 154(b) by 0 days.

(21) Appl. No.: 17/325,252

(22) Filed: May 20, 2021

(65) Prior Publication Data

US 2021/0368020 A1  Nov. 25, 2021

(30) Foreign Application Priority Data

May 22, 2020 (IN) .............................. 202021021581

(51) Int. Cl.
| | |
|---|---|
| *H04L 67/306* | (2022.01) |
| *H04L 67/562* | (2022.01) |
| *H04L 67/53* | (2022.01) |
| *H04L 67/51* | (2022.01) |

(52) U.S. Cl.
CPC .......... *H04L 67/2809* (2013.01); *H04L 67/16* (2013.01); *H04L 67/20* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 2011/0060649 A1* | 3/2011 | Dunk ................. | G06Q 30/0255 705/14.53 |
| 2011/0184880 A1* | 7/2011 | Neumann .............. | G06Q 30/06 705/344 |
| 2011/0238498 A1* | 9/2011 | Hassan ................ | G06Q 20/102 705/14.53 |
| 2012/0101886 A1* | 4/2012 | Subramanian ..... | G06Q 30/0611 705/14.23 |
| 2020/0374586 A1* | 11/2020 | Kumar ................ | H04L 65/4069 |
| 2021/0319071 A1* | 10/2021 | Liu ..................... | G06F 16/9535 |

* cited by examiner

*Primary Examiner* — James A Edwards
(74) *Attorney, Agent, or Firm* — Tim Tingkang Xia, Esq.; Locke Lord LLP

(57) ABSTRACT

The present invention provides a system and method for processing subscription related data, wherein a subscription document of an existing subscription is received by a server via a user device. The subscription document is processed to extract pre-determined parameters; and primary parameters are obtained from service provider servers and secondary parameters are obtained from third party servers. The pre-determined parameters are correlated with the primary parameters and the secondary parameters and a customized output is generated. The customized output may be a comparative analysis of particulars of the existing subscription and new subscriptions.

11 Claims, 2 Drawing Sheets

SYSTEM AND METHOD FOR PROCESSING SUBSCRIPTION RELATED DATA

CROSS-REFERENCE TO RELATED PATENT APPLICATION

This application claims priority to and the benefit of Indian Patent Application No. 202021021581 filed on May 22, 2020, which is incorporated herein in its entirety by reference.

FIELD OF THE INVENTION

The invention relates to a system and method for processing subscription related data.

BACKGROUND OF THE INVENTION

Service providers often provide services on a subscription basis for a limited tenure—monthly, quarterly or yearly basis. Although customers are likely to renew such subscriptions at end of tenure, there are certain customers who would want to change the service provider for various reasons. The customers may even want to change the service provider before end of tenure.

Changing of the service provider would entail filling of forms, providing documents and other information of the customer which may be cumbersome for the customer and time consuming. Systems are available whereby the customer can submit such information to an online portal of a service provider. The information to be submitted includes providing multiple data attributes which is tedious and time consuming. It may also require the customer to refer to subscription related documents for providing complete information. Owing to this, customers often abandon the process midway impacting the service provider, which is undesirable.

In cases where the customer can provide complete information, the service provider would process such information and revert to the customer with information regarding the subscription provided by the service provider. The processing of information once submitted is manual, and hence prone to errors and is time consuming. Moreover, the customer is provided with only pricing information, and customer's choice is limited basis with a comparison of pricing without any inputs/insights on customer feedback or rating. In this context, any insights on competing service providers would help the customer make an informed decision.

In view of the above, there is a need in the art to address at-least the aforementioned problems.

SUMMARY OF THE INVENTION

In one aspect, the present invention provides a system for processing subscription related data. The system comprises a user device configured to communicate with a server, one or more service provider servers, and one or more third-party servers, the system configured to: receive on the server via the user device a subscription document of an existing subscription of a service or an asset subscribed from a service provider; process on the server the subscription document and extract pre-determined parameters from the subscription document; establish a communication link between the server and one or more service provider servers and one or more third-party servers; obtain primary parameters from the one or more service provider servers and obtain secondary parameters from the one or more third party servers; correlate the pre-determined parameters with the primary parameters and the secondary parameters and generate a customized output on the user device.

In another aspect, the present invention provides a method for processing subscription related data. The method including the steps of: receiving on a server via a user device a subscription document of an existing subscription; processing the subscription document to extract pre-determined parameters from the subscription document; establishing a communication link between the server and one or more service provider servers and one or more third-party servers; obtaining at the server primary parameters from the one or more service provider servers and obtaining secondary parameters from the one or more third party servers; correlating the pre-determined parameters with the primary parameters and the secondary parameters; and generating a customized output on the user device.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention is directed towards processing subscription related data while renewing or changing a subscription for a particular service/product. The present invention is designed to simplify and reduce time taken to review and renew/change subscription/services offered by various service providers.

Figure 1:
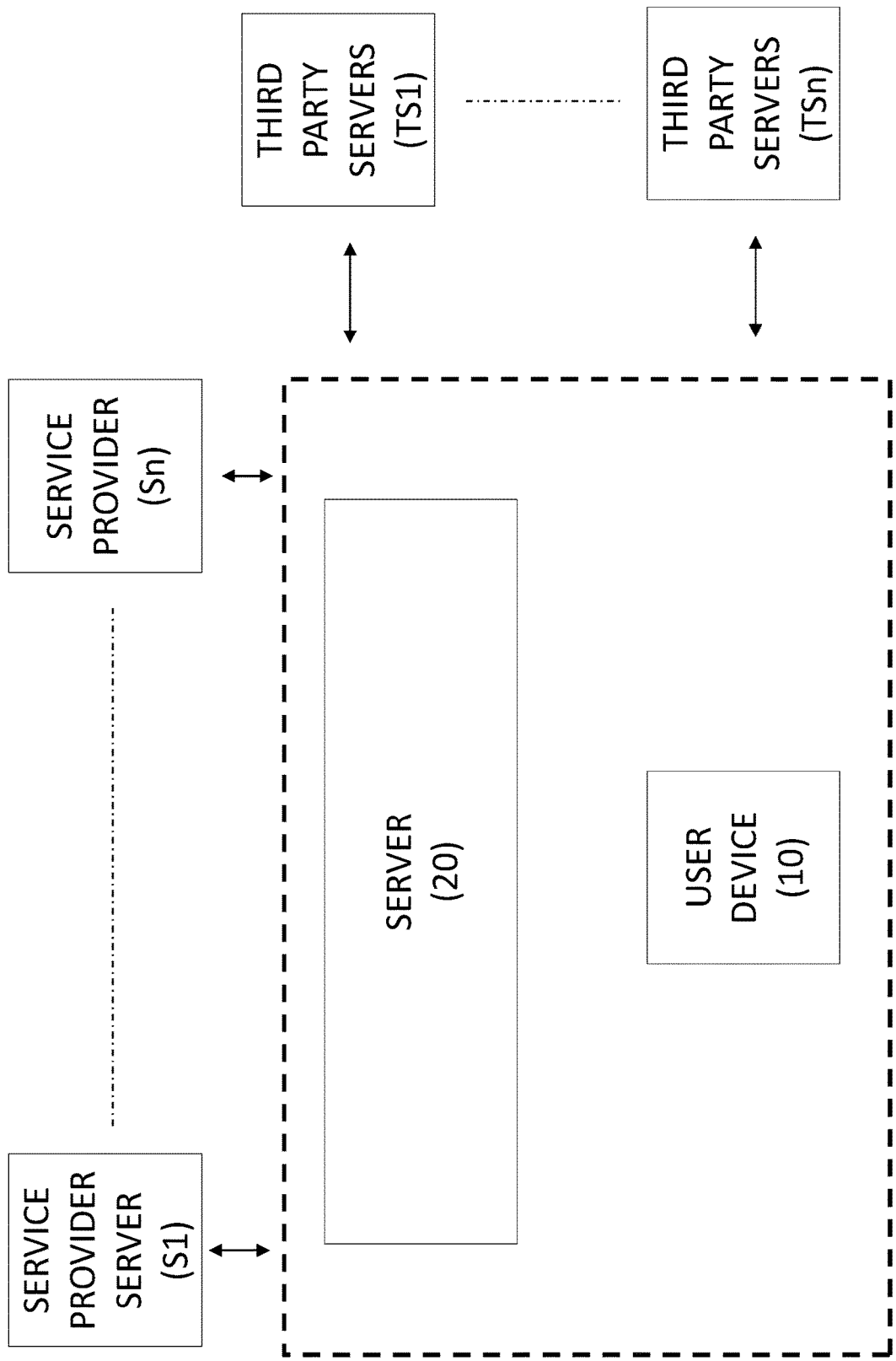
FIG. 1 shows a system for processing subscription related data in accordance with an embodiment of the invention.

FIG. 1 shows a system for processing subscription related data. The figure shows a user device 10 in communication with a server 20, and the system is configured to establish communication link with one or more service provider servers S (S1 to Sn) and one or more third-party servers TS (TS1 to TSn). The user device is an electronic device comprising of at least one or more processors, a memory, a storage unit, a communication module, a display/interactive display, input/output units etc. The user device can be any electronic device or portable device such as a smart phone, laptop, tablet, PC, etc. The user device is installed with a dedicated application which when executed allows the user device to connect and communicate with at least the server to obtain subscription related data. Alternately, the user device can communicate with the server through a dedicated web portal. The server comprises of at least one or more processors, a memory, a storage unit, a communication module, a display/interactive display, input/output units etc.

As discussed hereinbefore, subscription based services are provided by various service providers, and such subscription based services have a limited tenure, and have to be renewed for continuing the subscription. Accordingly, a user while renewing the subscription may continue with an existing service provider or a new service provider. The user can be a subscriber of the service or an agent facilitating subscription of services. The present invention upon request by the user obtains subscription related data offered by one or more service providers (including the existing service provider) in real-time enabling the user to make a decision to continue with the existing service provider or a new service provider.

Accordingly, users interested in renewing the subscription can access the system by providing a subscription document of an existing subscription which is received by the system. The user through the user device provides a subscription document of the existing subscription which may be transferred to the server. The subscription documents can be sent via email or submitted through the dedicated application or dedicated online portal. The subscription document comprises information of the subscription. The system is configured to process the subscription document, wherein the server processes the subscription document and extracts pre-determined parameters from the subscription document. The pre-determined parameters typically include bibliographic information, service or asset information, tenure of subscription, premium/fees for the subscription, etc. The server of the system establishes a communication link with one or more service provider servers and one or more third party servers and obtains primary parameters and secondary parameters from third party servers. The primary parameters include fees and tenure offered by the service provider which are retrieved based on the pre-determined parameters. The secondary parameters include ratings and credential related data, subscriber feedback, technical capabilities, social media inputs and industry benchmarks of the existing as well as new service providers. The extracted pre-determined parameters are correlated with primary parameters and secondary parameters by the server. In an embodiment, the extracted pre-determined parameters are converted to a machine-readable form and correlated with primary parameters and secondary parameters. The extracted pre-determined parameters are matched with the primary and the secondary parameters for each service provider in order to assist the user in decision making. Thereafter, based upon the correlation a customized output is provided and displayed on the user device. In this regard, the customized output is transferred from the server to the user device. The customized output may be a comparative analysis of particulars of the existing subscription and new subscription. In this regard, the comparative analysis can be based upon multiple key factors compiled from the primary parameters and secondary parameters. The customized output thus enables the user to make an informed choice on selecting the right service provider by continuing the existing service provider or changing the subscription to a new service provider. The present invention thus helps the user in decision making.

Figure 2:
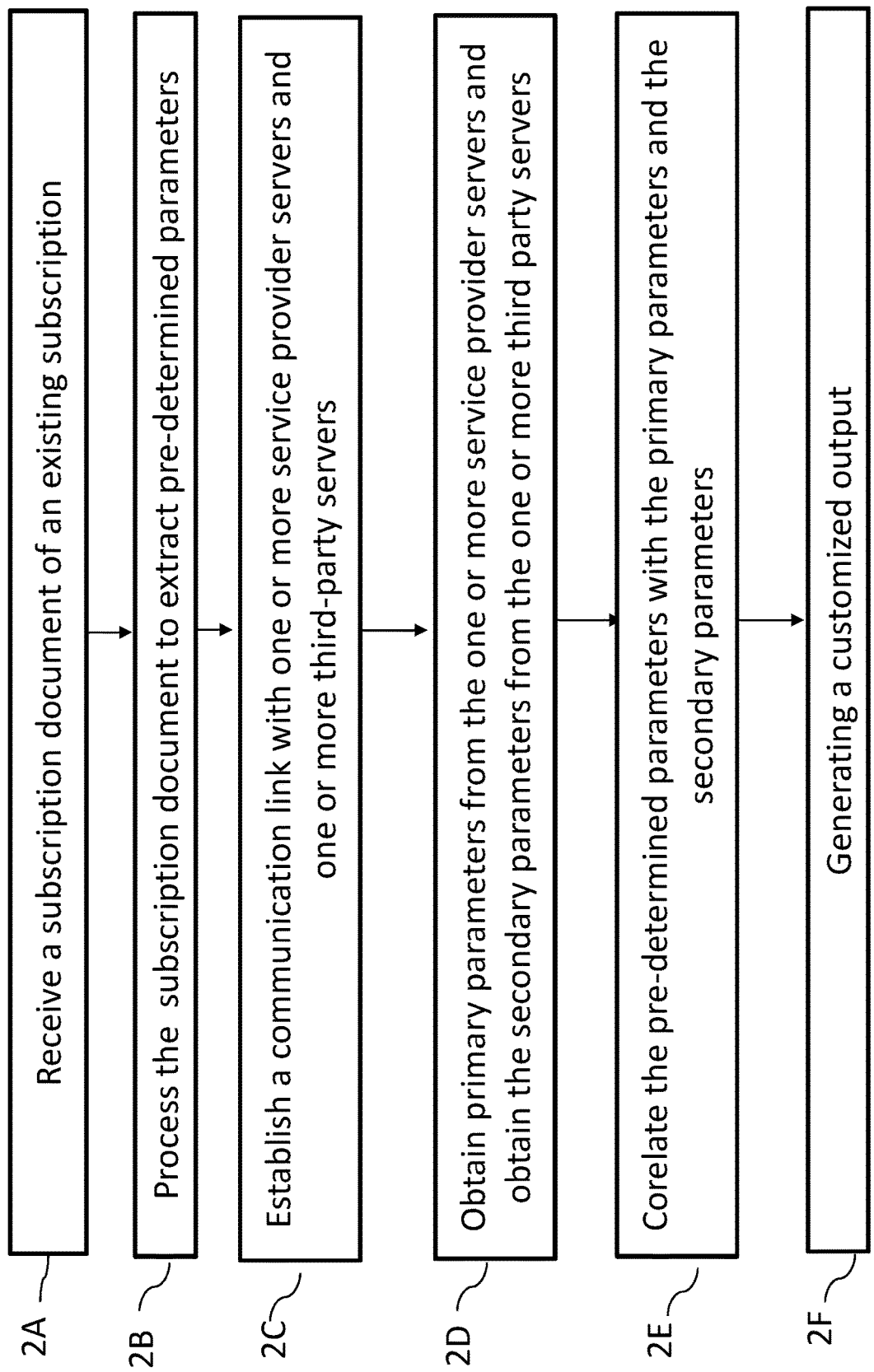
FIG. 2 shows a flow diagram of a method for processing subscription related data in accordance with an embodiment of the invention.

FIG. 2 shows a flow diagram of a method for processing subscription related data. In order to perform such a method, a system such as the system shown in FIG. 1 may be used. The method begins at step 2A, where a subscription document of an existing subscription is received by the system. The subscription documents can be sent via email or submitted through a dedicated application or dedicated online portal on a user-device which is transferred to a server. The subscription document comprises information of the subscription. At step 2B, the subscription document is processed by the server to extract pre-determined parameters from the subscription document. The pre-determined parameters typically include bibliographic information, service or asset information, tenure of subscription, premium/fees for the subscription, etc. The method at step 2C establishes a communication link between the server and one or more service provider servers, and one or more third-party servers. Thereafter, at step 2D, the method obtains primary parameters from the one or more service provider servers and obtains secondary parameters from the one or more third party servers. The primary parameters include fees and tenure offered by the service providers which is retrieved based on the pre-determined parameters. The secondary parameters include ratings and credential related data, subscriber feedback, technical capabilities, social media inputs and industry benchmarks of the existing as well as new service providers. At step 2E, the method correlates the pre-determined parameters with the primary parameters and the secondary parameters at the server. In an embodiment, the extracted pre-determined parameters are converted to a machine-readable form, and correlated with primary and secondary parameters at step. The extracted pre-determined parameters are matched with the primary and the secondary parameters for each service provider in order to assist the user in decision making. Thereafter, based upon the correlation a customized output is provided/displayed on the user device at step 2F. The customized output may be a comparative analysis of particulars of the existing subscription and new subscriptions. In this regard, the comparative analysis is provided for multiple key factors compiled from the primary parameters and secondary parameters. The customized output thus enables the user to take an informed choice on selecting the right service provider by continuing the existing service provider or changing the subscription to a new service provider.

In an example embodiment, the subscription is an insurance policy. Accordingly, the subscription service providers are insurance companies. A customer thus having an existing insurance policy and intending to renew the insurance policy can provide policy document of the insurance to the system of the present invention. The policy document is analysed by the system, and pre-determined parameters from the policy document are extracted. The pre-determined parameters typically include asset details (for example, make, model if asset is a vehicle), current subscription coverage details, current premium/fee paid for the insurance, etc. The extracted pre-determined parameters are compared with primary parameters and secondary parameters. The primary parameters are obtained from insurance companies, and secondary parameters are obtained from third-party companies. The primary parameters include fees and tenure offered by the insurance companies which is retrieved based on the pre-determined parameters i.e. based on the details of the asset. The secondary parameters include ratings and credential related data, subscriber feedback, technical capabilities, social media inputs and industry benchmarks of the existing as well as new insurance companies. Thereafter, based upon the correlation a customized output is provided on the user device. The customized output may be a comparative analysis of particulars of the existing insurance policy with other available insurance policies. The customized output thus enables the customer to take an informed choice on selecting the right insurance company by continuing with the existing insurance company or changing the insurance company.

Advantageously, the present invention provides data in relation to existing subscription along with data of other subscriptions. The user simply by providing a subscription document can get subscription related data from different service providers in real-time and renew the existing subscription or change to a new subscription depending upon the data processed.

While the present invention has been described with respect to certain embodiments, it will be apparent to those skilled in the art that various changes and modification may be made without departing from the scope of the invention as defined in the following claims.

We claim:

1. A system for processing subscription related data for a user in decision making, the system comprising: a server, a user device configured to communicate with the server, one or more service provider servers, and one or more third-party servers, the system configured to:
   receive on the server via the user device a subscription document of an existing subscription of a service or an asset subscribed from a service provider;
   process on the server the subscription document and extract pre-determined parameters from the subscription document;
   establish a communication link between the server and one or more service provider servers and one or more third-party servers;
   obtain primary parameters from the one or more service provider servers and obtain secondary parameters from the one or more third party servers;
   correlate the pre-determined parameters with the primary parameters and the secondary parameters, wherein the pre-determined parameters are matched with the primary parameters and the secondary parameters for each service provider in order to assist the user in decision making; and
   generate a customized output based upon the correlation of the pre-determined parameters with the primary parameters and the secondary parameters and transfer the customized output from the server to the user device, wherein the customized output is a comparative analysis of particulars of the different subscriptions offered by one or more service providers, wherein the comparative analysis is based upon multiple key factors compiled from the primary parameters and secondary parameters, and wherein the customized output thus enables the user to make an informed choice on selecting the right service provider by continuing the existing service provider or changing the subscription to a new service provider.

2. The system as claimed in claim 1, wherein the user device is selected from a group consisting of a smart phone, laptop, tablet, and PC, the user device comprising at least one or more processors, a memory, a storage unit, a communication module, a display/interactive display, and input/output units.

3. The system as claimed in claim 1, wherein the pre-determined parameters comprises bibliographic information, service or asset information, tenure of subscription, and premium/fees for the subscription.

4. The system as claimed in claim 1, wherein the primary parameters comprises fees and tenure offered by one or more service providers.

5. The system as claimed in claim 1, wherein the secondary parameters include ratings and credential related data, subscriber feedback, technical capabilities, social media inputs and industry benchmarks of different service providers.

6. The system as claimed in claim 1, wherein the extracted pre-determined parameters are converted to a machine-readable form and correlated with primary parameters and secondary parameters.

7. A method for processing subscription related data for a user in decision making, the method comprising the steps of:
   receiving on a server via a user device a subscription document of an existing subscription;
   processing the subscription document to extract pre-determined parameters from the subscription document;
   establishing a communication link between the server and one or more service provider servers and oner or more third-party servers;
   obtaining at the server primary parameters from the one or more service provider servers and obtaining secondary parameters from the one or more third party servers;
   correlating the pre-determined parameters with the primary parameters and the secondary parameters; and
   generating a customized output based upon the correlation of the pre-determined parameters with the primary parameters and the secondary parameters and transferring the customized output from the server to the user device, wherein the customized output is a comparative analysis of particulars of the different subscriptions offered by one or more service providers, wherein the comparative analysis is based upon multiple key factors compiled from the primary parameters and secondary parameters, and wherein the customized output thus enables the user to make an informed choice on selecting the right service provider by continuing the existing service provider or changing the subscription to a new service provider.

8. The method as claimed in claim 7, wherein the pre-determined parameters comprises bibliographic information, service or asset information, tenure of subscription, and premium/fees for the subscription.

9. The method as claimed in claim 7, wherein the primary parameters comprises fees and tenure offered by one or more service providers.

10. The method as claimed in claim 7, wherein the secondary parameters include ratings and credential related data, subscriber feedback, technical capabilities, social media inputs and industry benchmarks of different service providers.

11. The method as claimed in claim 7, wherein the extracted pre-determined parameters are converted to a machine-readable form and correlated with primary parameters and secondary parameters.

* * * * *